May 15, 1962 C. A. SCHROEDER 3,034,333

GAUGING DEVICE

Filed June 30, 1958

INVENTOR
CARL A. SCHROEDER

BY
ATTORNEY

United States Patent Office 3,034,333
Patented May 15, 1962

3,034,333
GAUGING DEVICE
Carl A. Schroeder, Dover, Ohio, assignor to Marsh Wall Products, Inc., Dover, Ohio, a corporation of Ohio
Filed June 30, 1958, Ser. No. 745,713
2 Claims. (Cl. 73—7)

The present invention relates to an article of manufacture comprising a gauge for measuring an abrasion test end point. More particularly, the invention relates to a gauge adapted for the determination of the end point in an abrasion test applied to flat sheet products coated with protective and/or decorative coating agents.

For many years, manufacturers of coated sheet products have employed standardized abrasion tests to determine the fitness of the products for their intended uses. One such test, and perhaps the most widely accepted, is carried out by a Taber Abraser machine. This device, well known in the art, comprises a test instrument which abrades a circular path on the surface of the selected test sample. After a given test cycle, the sample is examined to determine whether or not the coating tested possesses the desired durability. Up to the present, however, the end point determination of this test has been completely arbitrary and somewhat unreliable inasmuch as the chief means of evaluation has been a visual examination. Obviously such examination varies from one operator to the next and from one test to another. Accordingly, in some branches of the art, as a matter of fact, serious consideration has been given to the abandonment of this particular type of abrasion test.

It is a primary object of this invention to provide a means for the accurate determination of the end point of an abrasion test applied to flat, coated sheet material.

Another object of the invention resides in the provision of a simple gauge, easily employed, for determining abrasion test end points.

Figure 1:
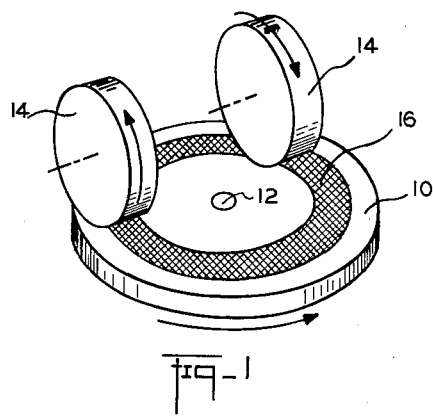
Figure 2:
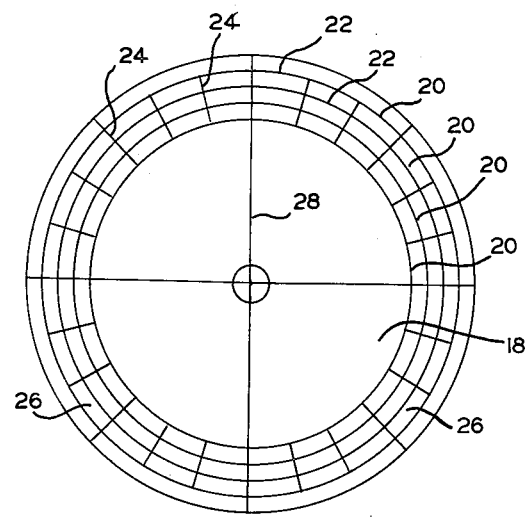

Other objects of the invention will become apparent from the following detailed description thereof. The description will be directed particularly to the accompanying drawing in which:

FIG. 1 is a diagrammatic sketch of the operation of a preferred abrasion test instrument, and FIG. 2 is a top plan view of the novel gauge of the invention.

In the drawing, FIG. 1 illustrates the method of abrading a test sample employing a typical instrument designated the Taber Abraser Model 174. The instrument and its mode of operation are described in detail in the Taber Abraser Manual copyrighted 1957 by the Taber Instrument Corporation.

Briefly, however, a coated sample such as that designated in FIG. 1 by the numeral 10 is mounted over the vertical drive shaft 12. The sample 10 is rotated on a vertical axis while, at the same time, being subjected to the sliding rotation of the two abrading wheels 14. The wheels 14 are driven by the sample 10 in opposite directions about a horizontal axis displaced tangentially from the axis of the sample. One abrading wheel rubs the specimen outwardly toward the periphery and the other, inward toward the center. The resulting abrasion path 16 forms a pattern of crossed arcs over an area of approximately 30 square centimeters. The pressure of the abrading wheels 14, and the consequent degree of abrasion varies according to two factors. The wheels may be weighted over a range dependent on the coating to be tested, and they may be obtained with grit and bond suitable for a wide range of test requirements.

In any event, once the desired conditions have been selected, the sample is rotated a predetermined number of revolutions and the abraded area 16 is then examined to evaluate the resistance to abrasion of the coating. In the case of baked enamel coated hardboard, for example, the industry has adopted the "Commercial Standard 176–51" as printed by the U.S. Department of Commerce. In this test, the sample is subjected to two No. CS–17 abrasion wheels (manufactured by the Taber Instrument corporation), with a 1,000 gram load on each wheel until the prime coat, or base material, shows through. The exact composition of the abrasive wheels is not known, but the abrasive grit therein is bound by a somewhat resilient binder. The coating must withstand at least 600 revolutions per mil of thickness of cover film. It is to be understood, however, that the test method will be varied according to the coating agent involved. Where the test sample comprises, for example, a porcelain enamel, the test conditions will be much more rigorous than where a baked enamel is to be tested.

The novel gauge of this invention comprises a flat transparent article 18 as shown in FIG. 2. The gauge may be fabricated from any transparent material such as acrylic, styrene, polyester, or the like synthetic resins, glass, or other desired material. The surface of the gauge contains a plurality of equidistant concentric circles 20 which encompass an area which corresponds, substantially, to the abraded area 16 of the sample as illustrated in FIG. 1. The circles 20 are, in turn, divided into arcs 22 by the portions of equiangular radii 24. The several arcs 22 and radii 24 define a plurality of radial segments 26 whose total area, of course, is encompassed by the circles 20. The quadrant lines 28 which extend across the circles serve to indicate the center of the gauge and to facilitate its use. All of the hereinbefore mentioned lines may be applied to the gauge surface as desired although they will preferably be of a permanent nature. While the gauge is illustrated as having a generally circular shape, obviously it may be of any selected shape, the only critical feature being that the area circumscribed by the circles 20 shall be adapted to overlie the abraded area of the sample tested.

In use, the gauge 18 is placed over the abraded sample 10 with the segments 26 substantially overlying the abraded area 16. The number of segments through which the coating agent has been worn away are then counted. If the worn area shows through, for example 50% of the segments 26, the coating is rated as passing. Of course, the number of segments through which the abraded coating agent shows will vary with the composition itself and the number of segments selected as representative of a satisfactory coating will be determined by the user himself or by decision of those skilled in the art.

It will be seen, however, that the novel gauge provides a means of determining an abrasion test end point visually while, at the same time, imparting to the evaluation a greatly improved degree of exactness. The gauge enables the determination of a numerical value based on the coverage of the abraded coating composition over a definite and standardized area. Thus, the novel device permits a reliable evaluation of abrasion resistance which has heretofore been lacking in the art.

I claim:
1. A gauge for determining measurement of the end point of abrasion resistance of a coated flat sheet article where said article is subjected to rotation on a vertical axis against the sliding rotation of two abrading wheels which comprises, a flat transparent article having on its surface a plurality of uniformly spaced-apart circles, the area encompassed by said circles adapted to overlie the abraded area of said coated sheet, and said circular area divided into a plurality of radial segments.

2. A gauge for determining measurement of the end point of an abrasion test wherein a coated flat sheet article is subjected to rotation on a vertical axis againsnt the sliding rotation of two abrading wheels which comprises, a flat transparent article having on its surface a plurality of equidistant concentric circles, the area encompassed by said circles adapted to overlie the abraded area of said coated sheet, and said area within the bounds of said circles divided into a plurality of segments by a plurality of equiangular radii.

References Cited in the file of this patent

UNITED STATES PATENTS

| | | |
|---|---|---|
| 2,007,986 | Sprague | July 16, 1935 |
| 2,016,346 | Smith | Oct. 8, 1935 |

FOREIGN PATENTS

| | | |
|---|---|---|
| 106,246 | Great Britain | May 17, 1917 |

OTHER REFERENCES

Publication: Automotive Industries, Dec. 7, 1935, page 762.

Publication: Bulletin 5604 "Taber Abrasion Testing Set Model 174"; copy received May 7, 1957.